United States Patent
Pinskiy

(10) Patent No.: US 12,400,401 B2
(45) Date of Patent: Aug. 26, 2025

(54) MEASUREMENT SPACE DEFORMATION INTERPOLATION

(71) Applicant: SpreeAI Corporation, Incline Village, NV (US)

(72) Inventor: Dmitriy Vladlenovich Pinskiy, Woodland Hills, CA (US)

(73) Assignee: SpreeAI Corporation, Incline village, NV (US)

( * ) Notice: Subject to any disclaimer, the term of this patent is extended or adjusted under 35 U.S.C. 154(b) by 0 days.

(21) Appl. No.: 17/920,716

(22) PCT Filed: Dec. 14, 2021

(86) PCT No.: PCT/US2021/063353
§ 371 (c)(1),
(2) Date: Oct. 21, 2022

(87) PCT Pub. No.: WO2022/146681
PCT Pub. Date: Jul. 7, 2022

(65) Prior Publication Data
US 2023/0169726 A1    Jun. 1, 2023

Related U.S. Application Data

(63) Continuation of application No. 17/357,394, filed on Jun. 24, 2021, now abandoned.
(Continued)

(51) Int. Cl.
*G06T 17/20* (2006.01)
*G06T 13/40* (2011.01)
(Continued)

(52) U.S. Cl.
CPC .............. *G06T 17/20* (2013.01); *G06T 13/40* (2013.01); *G06T 15/04* (2013.01); *G06T 19/20* (2013.01);
(Continued)

(58) Field of Classification Search
CPC ....... G06T 17/00; G06T 19/006; G06T 19/20; G06T 2200/24; G06T 13/40;
(Continued)

(56) References Cited

U.S. PATENT DOCUMENTS 6,466,215 B1    10/2002  Matsuda et al.
6,546,309 B1     4/2003  Gazzuolo
(Continued)

FOREIGN PATENT DOCUMENTS

CN    110930500 A    3/2020
WO    2014161429 A1   10/2014
(Continued)

OTHER PUBLICATIONS

Burkov, "Neural Head Reenactment with Latent Pose Descriptors", Procedings of the IEEE/CVF Conference on Computer Vision and Pattern Recognition (CVPR) 2020, pp. 13766-13795; Oct. 30, 2020. https://arxiv.org/pdf/2004.12000.
(Continued)

*Primary Examiner* — Xiao M Wu
*Assistant Examiner* — Scott E Sonners
(74) *Attorney, Agent, or Firm* — FIG. 1 Patents

(57) ABSTRACT

Computer implemented measurement space deformation method and apparatus. A method embodiment comprises defining a measurement space as a multi-dimensional space, populating the measurement space with a set of pre-computed example avatars, searching the measurement space for a subset of example avatars, and interpolating between the example avatars of the subset.

20 Claims, 15 Drawing Sheets

Related U.S. Application Data

(60) Provisional application No. 63/132,173, filed on Dec. 30, 2020.

(51) Int. Cl.
*G06T 15/04* (2011.01)
*G06T 19/20* (2011.01)

(52) U.S. Cl.
CPC .. *G06T 2210/16* (2013.01); *G06T 2219/2021* (2013.01)

(58) Field of Classification Search
CPC ............... G06T 2200/04; G06T 19/00; G06T 2207/30196; G06T 2219/2021; G06T 2207/20081; G06T 2207/20084; G06T 2200/08; G06T 7/149; G06T 2210/16; G06T 2207/20124; G06T 2215/16; G06T 13/20; G06T 2219/2024; G06T 2207/20221; G06T 15/00; G06T 2210/44; G06T 7/564; G06T 2207/20092; G06T 13/00; G06T 2213/08; G06T 2213/12; G06T 5/60; G06T 9/002; G06F 3/011; G06F 18/22; G06V 20/20; G06V 20/653; G06Q 30/0643; G06Q 30/0631; G06Q 30/0621; G06Q 30/0601; A63F 13/655; A63F 2300/695; A63F 2300/5553
See application file for complete search history.

(56) References Cited

U.S. PATENT DOCUMENTS

| | | | |
|---|---|---|---|
| 6,731,287 B1 | 5/2004 | Erdem | |
| 10,255,681 B2 | 4/2019 | Price et al. | |
| 10,936,853 B1 | 3/2021 | Sethi et al. | |
| 2007/0091085 A1 | 4/2007 | Wang et al. | |
| 2007/0188502 A1 | 8/2007 | Bishop | |
| 2009/0066700 A1 | 3/2009 | Harding et al. | |
| 2010/0030578 A1* | 2/2010 | Siddique | H04W 4/00 705/26.1 |
| 2010/0111370 A1* | 5/2010 | Black | G06F 18/2321 705/26.1 |
| 2010/0306082 A1* | 12/2010 | Wolper | G06Q 30/0603 345/619 |
| 2011/0292034 A1* | 12/2011 | Corazza | G06T 17/20 345/419 |
| 2013/0100140 A1 | 4/2013 | Ye et al. | |
| 2013/0314412 A1 | 11/2013 | Gravois et al. | |
| 2014/0176565 A1* | 6/2014 | Adeyoola | G06F 18/22 345/473 |
| 2016/0163084 A1 | 6/2016 | Corazza et al. | |
| 2016/0247017 A1 | 8/2016 | Sareen et al. | |
| 2016/0284018 A1 | 9/2016 | Adeyoola et al. | |
| 2017/0004657 A1 | 1/2017 | Zagel et al. | |
| 2017/0080346 A1 | 3/2017 | Abbas | |
| 2018/0047200 A1 | 2/2018 | O'Hara et al. | |
| 2018/0197347 A1 | 7/2018 | Tomizuka | |
| 2018/0240280 A1 | 8/2018 | Chen et al. | |
| 2018/0240281 A1 | 8/2018 | Vincelette | |
| 2019/0122424 A1* | 4/2019 | Moore | G06T 7/62 |
| 2019/0130649 A1 | 5/2019 | O'brien et al. | |
| 2019/0266806 A1* | 8/2019 | Aluru | G06T 13/40 |
| 2019/0287301 A1 | 9/2019 | Colbert | |
| 2019/0371032 A1 | 12/2019 | Scapel et al. | |
| 2020/0126316 A1 | 4/2020 | Sharma et al. | |
| 2020/0234508 A1 | 7/2020 | Shaburov et al. | |
| 2020/0258280 A1 | 8/2020 | Park et al. | |
| 2020/0294294 A1 | 9/2020 | Petriv et al. | |
| 2020/0306640 A1 | 10/2020 | Kolen et al. | |
| 2020/0320769 A1 | 10/2020 | Chen et al. | |
| 2020/0334867 A1 | 10/2020 | Chen et al. | |
| 2020/0346420 A1 | 11/2020 | Friedrich | |
| 2020/0364533 A1 | 11/2020 | Sareen et al. | |
| 2020/0364945 A1* | 11/2020 | Lin | A63F 13/533 |
| 2020/0402307 A1 | 12/2020 | Tanwer et al. | |
| 2021/0049811 A1 | 2/2021 | Fedyukov et al. | |
| 2021/0150187 A1 | 5/2021 | Karras et al. | |
| 2021/0303919 A1 | 9/2021 | Niu | |

FOREIGN PATENT DOCUMENTS

| | | |
|---|---|---|
| WO | 2017029488 A2 | 2/2017 |
| WO | 2017143392 A1 | 8/2017 |
| WO | 2018089039 A1 | 5/2018 |
| WO | 2018154331 A1 | 8/2018 |
| WO | 2019050808 A1 | 3/2019 |
| WO | 2019164266 A1 | 8/2019 |
| WO | 2020038254 A1 | 2/2020 |
| WO | 2020104990 A1 | 5/2020 |
| WO | 2022221398 A1 | 10/2022 |

OTHER PUBLICATIONS

Deng, "Disentangled and Controllable Face Image Generation via 3D Imitative-Contrastive Learning", Computer Vision Foundation Conference, Procedings of the IEEE/CVF Conference on Computer Vision and Pattern Recognition (CVPR) 2020, pp. 5154-5163; open access version. https://arxiv.org/abs/1904.01909.

Tripathy, "ICface: Interpretable and Controllable Face Reenactment Using GANs", Proceedings of the IEEE/CVF Winter Conference on Applications of Computer Vision (WACV) 2020, pp. 3385-3394; Jan. 17, 2020. https://arxiv.org/abs/1904.01909.

Huang, "Learning Identity-Invariant Motion Representations for Cross-ID Face Reenactment", Procedings of the IEEE/CVF Conference on Computer Vision and Pattern Recognition (CVPR) 2020, pp. 7084-7092, 2020, open access version, https://openaccess.thecvf.com/content_CVPR_2020/html/Huang_Learning_Identity-Invariant_Motion_Representations_for_Cross-ID_Face_Reenactment_CVPR_2020_paper.html.

Thies, "Face2Face: Real-Time Face Capture and Reenactment of RGB Videos", Jul. 29, 2020; abstract of this paper published in 2016 by IEEE at https://ieeexplore.ieee.org/document/7780631.

Zhao, "Joint face alignment and segmentation via deep multi-task learning", published in Multimedia Tools and Applications 78, 13131-13148 (2019), published by Springer Nature, 1 New York Plaza, Suite 4600, New York, NY 10004-1562, U.S.A., Jan. 12, 2018 https://doi.org/10.1007/s11042-018-5609-1.

Li, "FaceShifter: Towards High Fidelity and Occlusion Aware Face Swapping", Peking University and Microsoft Research, Sep. 15, 2020. lililngzhi@pku.edu.cn and jianbao.haya.doch.fangwen@microsoft.com; pdf version available at: https://arxiv.org/pdf/1912.13457.pdf.

Nirkin, "FSGAN: Subject Agnostic Face Swapping and Reenactment", Computer Vision Foundation, ICCV 2019, open access version, Aug. 2019, https://arxiv.org/pdf/1908.05932.pdf ; also published in Proceedings of the IEEE International Conference on Computer Vision, pp. 7184-7193 and on Yuval Nirkin's website: https://nirkin.com/fsgan/.

Naruniec, "High-Resolution Neural Face Swapping for Visual Effects", Eurographics Symposium on Rendering 2020, vol. 39 (2020), No. 4. https://studios.disneyresearch.com/wp-content/uploads/2020/06/High-Resolution-Neural-Face-Swapping-for-Visual-Effects.pdf; also published by the Eurographics Association, c/o Fiduciare A. Richard SA, Avenue de Frontenex 32, 1207 Geneva, Switzerland, IDE CHE-100.558.3722020 https://diglib.eg.org/andle/10.2312/2632924.

Wawrzonowski et al. "Mobile devices' GPUs in cloth dynamics simulation", Proceedings of the Federated Conference on Computer Science and Information Systems, Prague, Czech Republic, 2017, pp. 1283-1290. Retrieved on Feb. 23, 2022. Retrieved from UKL: https://annals-csis.orgVolume_11/drp/pdf/191.pdf.

"Goes, F. et al., ""Garment Refitting for Digital Characters""", SIGGRAPH '20 Talks, Aug. 17, 2020, Virtual Event, USA; 2 pages. ACM ISBN 978-1-4503-7971-7/20/08. https://doi.org/10.1145/3388767.3407348".

(56) References Cited

OTHER PUBLICATIONS

Lewis et al., "Pose Space Deformation: A Unified Approach to Shape Interpolation and Skeleton-Driven Deformation", SIGGRAPH 2000, New Orleans, Louisiana, USA, pp. 165-172.

Neophytou et al., "Shape and Pose Space Deformation for Subject Specific Animation", Centre for Vision Speech and Signal Processing (CVSSP), University of Surrey, Guildford, United Kingdom; IEEE Conference Publication, IEEE Xplore, 2013, 8 pages.

Pose space deformation, article in Wikipedia, downloaded Jul. 29, 2022, 2 pages.

Kim et al., "Deep Video Portraits", ACM Trans. Graph, vol. 37, No. 4, Article 163; published online May 29, 2018, pp. 163:1-14; Association for Computing Machinery, U.S.A. https://arxiv.org/pdf/1805.11714.pdf.

"Extended European Search Report", European Application No. 22788638.9, Dec. 13, 2024, 7 pages.

"Extended European Search Report", EP Application No. 22746447.6, Dec. 16, 2024, 6 pages.

"EP Search Report", EP Application No. 22788848.4, Jan. 20, 2025, 6 pages.

Lewis, et al., "Vogue: Try-On by StyleGAN Interpolation Optimization", Cornell University Library, Ithaca NY, Jan. 6, 2021, 15 pages.

\* cited by examiner

Variation 1
Input:
*T Mesh
*G Mesh
Output:
R Resulting Mesh Has:
- Topology of T
- Geometry of G
- UV Boundaries of G
- UV Parameterization of T Pseudocode:
    R = T
    Copy UV Boundary(Source: G, Target: R)
    Copy UV Parameterization(Source: T, Target: R)
    Copy 3D Geometry(Source: G, Target: R)
    Output R

Variation 2
Input:
* T Mesh
* G Mesh
Output:
R Resulting Mesh Has:
- Topology of T
- Geometry of G
- UV Boundaries and UV Parameterization of G

Pseudocode:
    R = T
    Copy UV Boundary(source: G, target: R)
    Copy UV Parameterization(source: G, target: R)
    Copy 3D Geometry(source: G, target: R)
    Output R

Variation 3
Input:
* T Mesh
* G Mesh
Output:

FIG. 12

R Resulting Mesh Has:
- Topology of T
- Geometry of G
- UV Boundaries and UV Parameterization of T

Pseudocode:
R = T
Copy 3D Geometry(Source: G, Target: R)
Output R

Copy UV Boundary

Input:

* S Source mesh
* T Terget mesh

Out put:

Modified T by Having its UV Boundaries Projected onto S's UV boundaries

Pseudocode:
GetShells(Mesh: S, uv Shells: sShells)
GetShells(Mesh: T, uv Shells: tShells)

For Each sShell in sShells:
    Find tShell, tShells uv Shell that Corresponds to sShell
    Build uv Boundaries, an array of corresponding pairs boundaries of tShell
and
    sShell
For Each tBoundary and sBoundary in uvBoundaries
    Redefine UV Positions of tBoundary Points by Projecting them onto Curve
    Defined by Points of sBoundary

Copy UV Parameterization

Input:
* S Source Mesh
* T Target Mesh

Output:

Modified T by Making its UV Parameterization Consistent with S's UV Parameterization FIG. 12
(Continued)

Pseudocode :
GetShells(Mesh: S, uv Shells: sShells)
GetShells(Mesh: T, uv Shells: tShells)

For Each sShell in sShells:
   Subdivide sShell into One or More of Overlapping Regions, sRegions
   Find tShell, tShells Shell that Corresponds to sShell
   Subdivide tShell into One or More of Overlapping Regions, tRegions
   Build uvRegions, an Array of Corresponding Pairs of sRegions and tRegions
   (Note: this can be Accomplished by Normalizing
   uv Coordinates of Points of sShell and tShell)
For Each Pair (tRegion, sRegion) in uvRegions
   Redefine UV Positions of Points of tRegion
   by Enforcing the Same Relative Point Density as in sRegion

Copy 3D Geometry

Input:
* S source mesh
* T Target mesh
Output:
Modified T by having its points described S's 3D Shape

Pseudocode :
   GetShells(Mesh: S, uv Shells: sShells)
   GetShells(Mesh: T, uv Shells: tShells)

For Each tShell in tShells:
      Find sShell, sShells' Shell that Corresponds to tShell
   For Each tV Vertex of tShell
      Let tUV be uv Component of tV
      Project tUV onto sShell in UV Space
      Express Projection in Barycentric Coordinates of S in UV Space
      Let t3D be XYZ Component of tV
      Set t3D be Result of Evaluation the Barycentric Coordinates of S in 3D Space FIG. 12
(Continued)

MEASUREMENT SPACE DEFORMATION INTERPOLATION

CROSS-REFERENCE TO RELATED APPLICATIONS

This patent application is a 35 U.S.C. 371(c) application of international patent application PCT/US2021/063353, filed Dec. 14, 2021, which claims priority upon U.S. patent application Ser. No. 17/357,394, filed Jun. 24, 2021, and also claims the benefit of U.S. provisional patent application 63/132,173, filed Dec. 30, 2020, all of which previous patent applications are hereby incorporated by reference herein in their entireties (including all references and appendices cited in said previous patent applications) for all purposes, as if fully set forth herein.

TECHNICAL FIELD

This invention pertains to the field of using computers to create avatars, wherein a measurement space deformation (MSD) technique is utilized generate the electronic animation of a user, based on an interpolation between pre-computed examples.

DISCLOSURE OF INVENTION

The present invention is a computer implemented measurement space deformation method and apparatus. A method embodiment comprises defining a measurement space as a multi-dimensional space, populating the measurement space with a set of pre-computed example avatars, searching the measurement space for a subset of example avatars, and interpolating between the example avatars of the subset.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 12 illustrates example code used to implement aspects of the present invention.

DETAILED DESCRIPTION OF PREFERRED EMBODIMENTS

The present invention pertains to systems and methods for the generation of a realistic customized computer animation of a user wearing a particular one or more cloth garments. In exemplary embodiments, an avatar representing the user's likeness in body shape and size is generated, and different garments are draped on the avatar of the user to simulate how the garment(s) would look on the actual body of the human user. The computer animation can be generated for any user, wearing any size garment, in substantially real-time.

Figure 13:
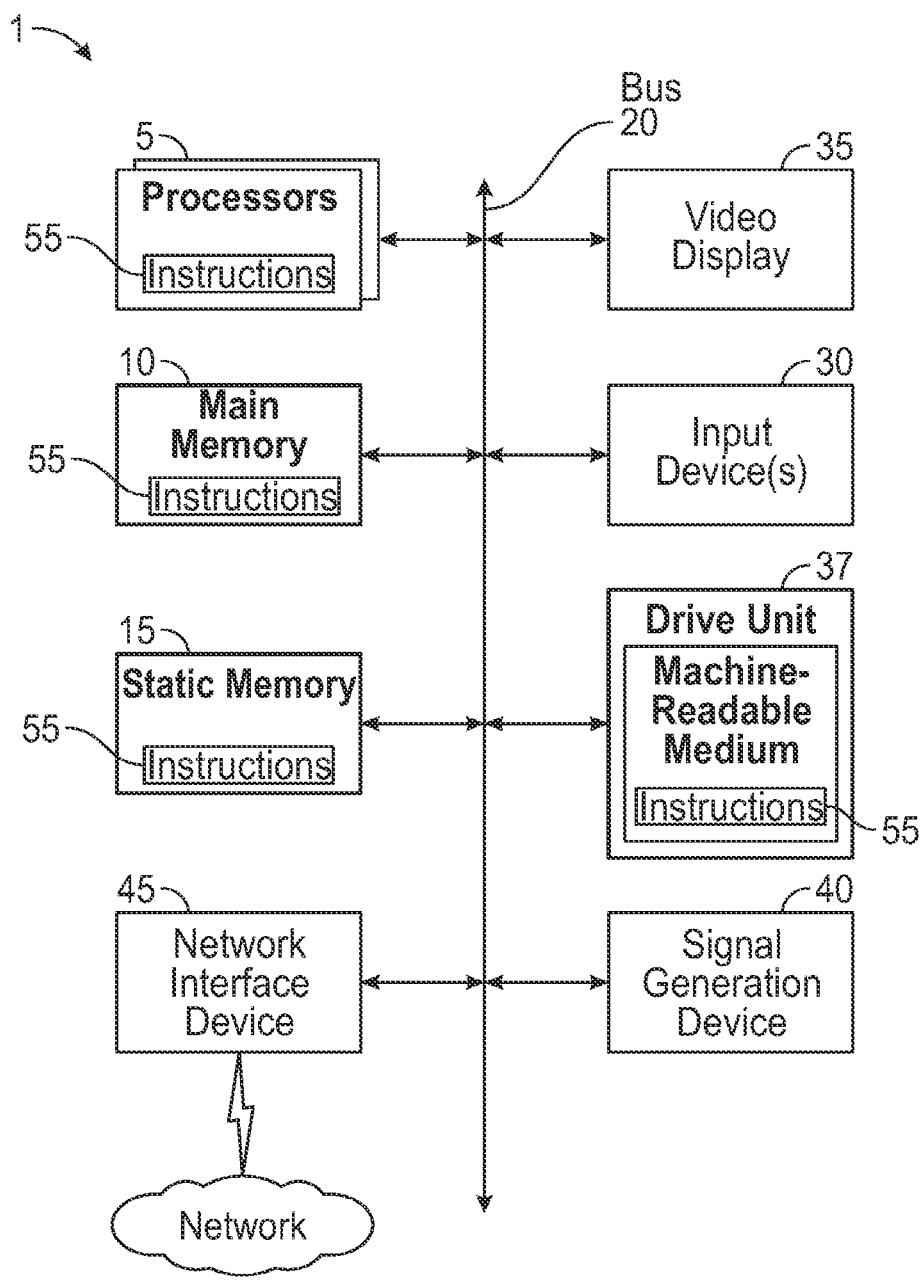
FIG. 13 is schematic diagram of an example computerized system of the present invention.

For context, the methods of the present invention can be performed by a specifically configured computing system. FIG. 13 illustrates an example computer system that can be programmed for use in accordance with the present invention. That is, the computer system can be configured to provide three-dimensional modeling for use in generating a realistic computer avatar of a user wearing a particular garment. For clarity, the specifically programmed system disclosed herein will be referenced as the "3D system".

In exemplary embodiments, a measurement space deformation (MSD) technique is utilized generate the electronic animation of a user, based on an interpolation between pre-computed examples. In typical computer animation, an animation is simply created for each person for which an avatar is needed. However, in embodiments of the present invention, a computer animation is generated to represent any human user of any body shape and size. Further, the animation needs to depict how a particular garment would look on the user in a realistic manner Thus, to quickly create this customized computer animation, pre-computed example avatars are first generated. Then an interpolation is conducted between the pre-computed examples of avatars to represent a human user.

To accomplish this interpolation, a multi-dimensional space is first built based on measurements of a human body, such as hip length, bust length, arm length, leg length, etc. Then, an interpolation measurement space is generated with different pre-computed examples. If a user has a particular body measurement that has not been seen before, the computing system finds the closest examples in the measurement space and interpolates between them to generate the customized realistic avatar of the human user, based on a bounding volume. In this way, a computer generated simulation can be generated of an avatar based on what other known avatars look like in the measurement space.

Creating a realistic animated avatar of a human body is different from other types of computer animation, since human body dimensions are dependent on one another. For example, a person with long hands would have a bicep that looks differently than a person with short hands. In another example, location of biceps depends on body height. Thus, measurements such as body height, length of legs, and others, dictate points that correspond to biceps on the avatar.

Because of the interdependency among body measurements, the interpolation to generate the customized realistic animated avatar needs to be done in a particular order to construct the avatar body. In embodiments of the present invention, a dependency graph of body measurement dependencies is constructed and utilized to determine an order for construction of the avatar body.

Further, there are different types of human body measurements—those that correspond to width and those that correspond to length. In an example embodiment, given an input of a user height, a minimum and a maximum boundary is determined for the avatar height. The minimum and maximum boundaries correspond to different subsets of measurement spaces, with the measurement spaces defining width type measurements. Interpolating between the user width measurements and each of the minimum and maximum boundaries yields two examples of minimum height and maximum height for the avatar. Then a second interpolation is conducted between these two examples to construct the avatar for the user.

Further, the avatar for the user can be constructed based on varying measurements from the minimum and maximum examples. For example, a user may have long legs and a short torso. In constructing the avatar for the user, leg measurements from the maximum example avatar may be utilized, while torso measurements from the minimum example avatar may be utilized.

An avatar may also be painted with special weights. For example, an area may be designated as having vertices that all correspond to a human wrist. This area may be deemed to be 100% wrist and no other substantive body part, and painted with a weight of 1, with all other body parts painted with a weight of 0 for wrist vertices. For a progression on an arm from wrist towards elbow, the weights transition from wrist 1/elbow 0 at the wrist vertices to wrist 0/elbow 1 at the elbow vertices. In a similar manner, weights can be painted throughout all major body parts of the avatar. Appendix A illustrates MSD and interpolation techniques discussed herein in more detail.

Further embodiments of the present disclosure allow for the generation of realistic customized avatars in different sizes, each avatar wearing a same garment. Generally, to use interpolation techniques, all examples have the same topology, same number of vertices, and same connectivity between vertices. However, in reality, different sized clothes have a different subset of measurements. For example, a maxi dress with long sleeves on a person of size 2 may reach all the way down to the person's ankles and to the wrists. The same dress fitted on a person of size 18 may not reach all the way down to the ankles, and/or the sleeves may not reach all the way down to the person's wrists. Thus, a realistic portrayal of the way the dress would fit on a size 18 person cannot simply be a bigger version of the fit on a size 2 person.

To solve this problem, embodiments of the present invention provide a scheme to force a uniform topology for different clothing sizes to conduct the interpolation methods discussed herein and to generate realistic looking avatars wearing a same garment in different sizes. In one example, garment sizes are described in a local coordinate version of an avatar. That is, the system looks for which vertices are the closest vertices to a particular vertex of the avatar. In an example, for a size 2 avatar, vertices 1-5 may correspond to a wrist. However, for a size 22 avatar, there would be different vertices on the garment that correspond to the wrist. In this way, the garment will drape over the avatar of different sizes in a same manner as the garment would drape over an actual person of those sizes.

Further, the interpolation methods rely on weights painted on the avatar, instead of painting weights on the garment itself. The garment is described in terms of displacement in relation to the avatar. The displacements are then interpolated to create the avatar. Appendix B illustrates in more detail the techniques for influencing realistic garment sizes in MSD.

Generally speaking, an example 3D system of the present invention utilizes mesh analysis to represent a three-dimensional surface. In some instances, the mesh can comprise a plurality of vertices, also referred to as points. Vertices can be connected by edges. In some instances, vertices and edges can form shapes such as triangles or other similar polygons. Thus, when edges that connect vertices form a closed loop, a face is created. The three-dimensional surface may be conceptually thought of as a pattern of faces.

Any surface topology can be represented using vertices, edges, and faces. The creation of mesh allows for accurate representation of a surface in three-dimensions. These methods are more efficient in representing three-dimensional surfaces than point-clouds. To be sure, while a three-dimensional surface can be sampled to identify points and create a point-cloud, this process can be quite data intensive depending on the number of vertices/points obtained. The modeling disclosed herein provides advantages over point-cloud processes, and does not require the same amount of data, but still provides accurate 3D representations.

Figure 1:
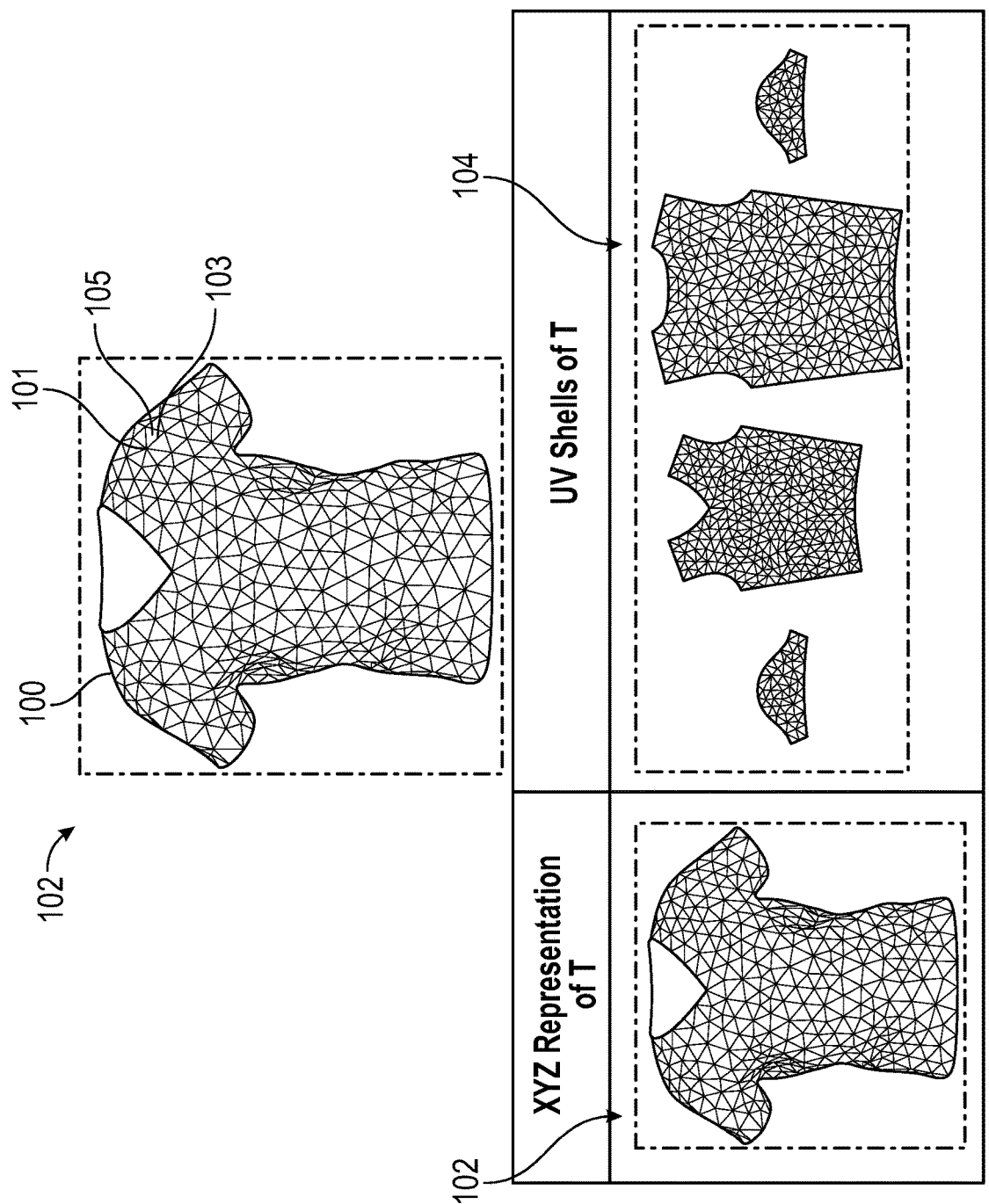
FIG. 1 is a screenshot of a topology mesh T and UV shells of the Topology mesh T.

FIG. 1 is a screenshot of a topology mesh T related to a three-dimensional object, such as a shirt 100. An XYZ representation 102 of the topology mesh T and UV shells 104 are also illustrated. The topology includes vertices such as vertex 101, edges, such as edge 103, and example faces, such as face 105. As noted, the topology includes a plurality of faces. In some embodiments, the 3D system can assign each vertex/point a unique identifier. Edges connecting between two vertices can also be numbered uniquely, as well as identified in terms of the vertices they span between. The same identification process can be used for faces, allowing the 3D system to know which edges and vertices belong to which faces. This collective information is referred to as topology. Further, when referring to geometry, this will be understood to include the surface/face (or group of faces) that are implied by the relative 3D position of each of the vertices associated with the face(s). In FIG. 1, the dark lines or edges form a topology and the shirt is the underlying geometry. The vertices, edges, and faces of the topology form a consistent representation of the underlying geometry of the shirt 100.

For context, a topology mesh comprises a mesh having a desired topology and desired UV shell density. Also, for context, a geometry mesh includes a mesh having a desired geometry and desired UV shell boundaries. The use of both geometry and topology meshes will be described in greater detail below.

Figure 2:
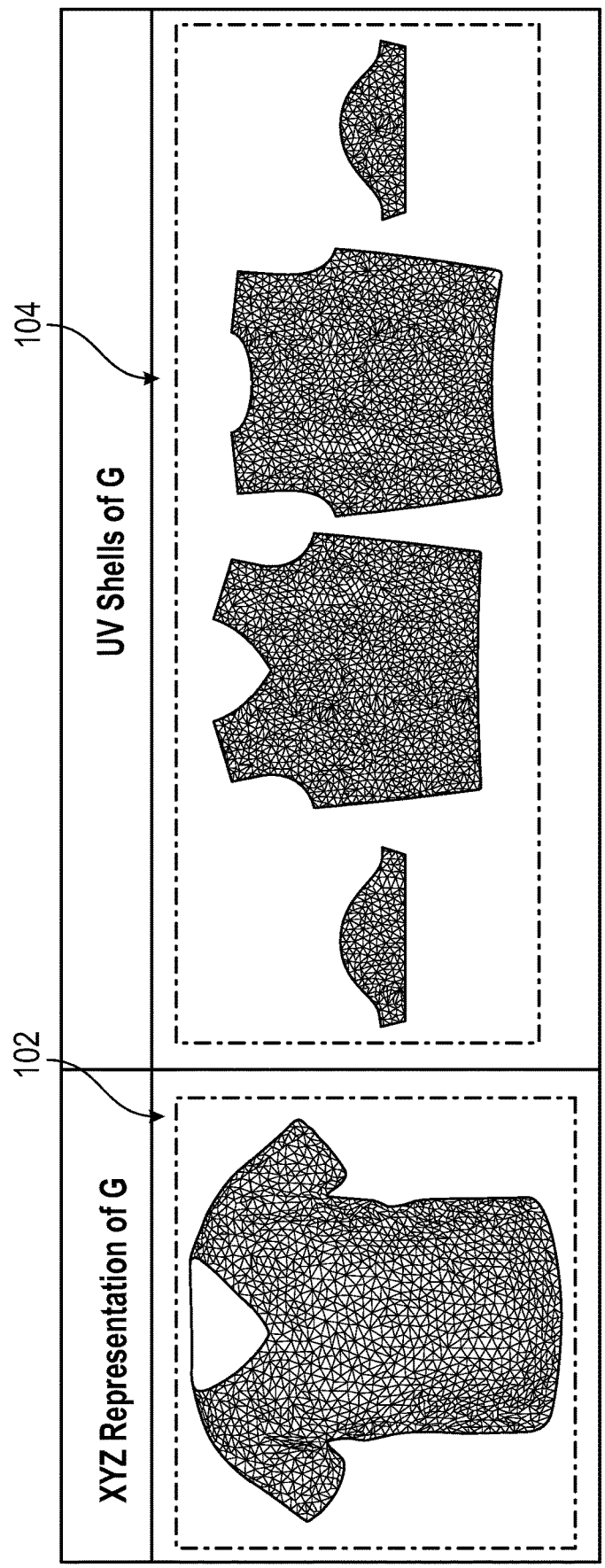
FIG. 2 is a screenshot of an XYZ representation of the geometry mesh G and illustrations of UV shells of the geometry mesh G.

FIG. 2 illustrates an XYZ representation 102 of the geometry mesh G and UV shells 104 of the geometry mesh G are also illustrated. The 3D system can determine a resulting mesh R that has a desired topology and desired UV shell density.

Figure 3:
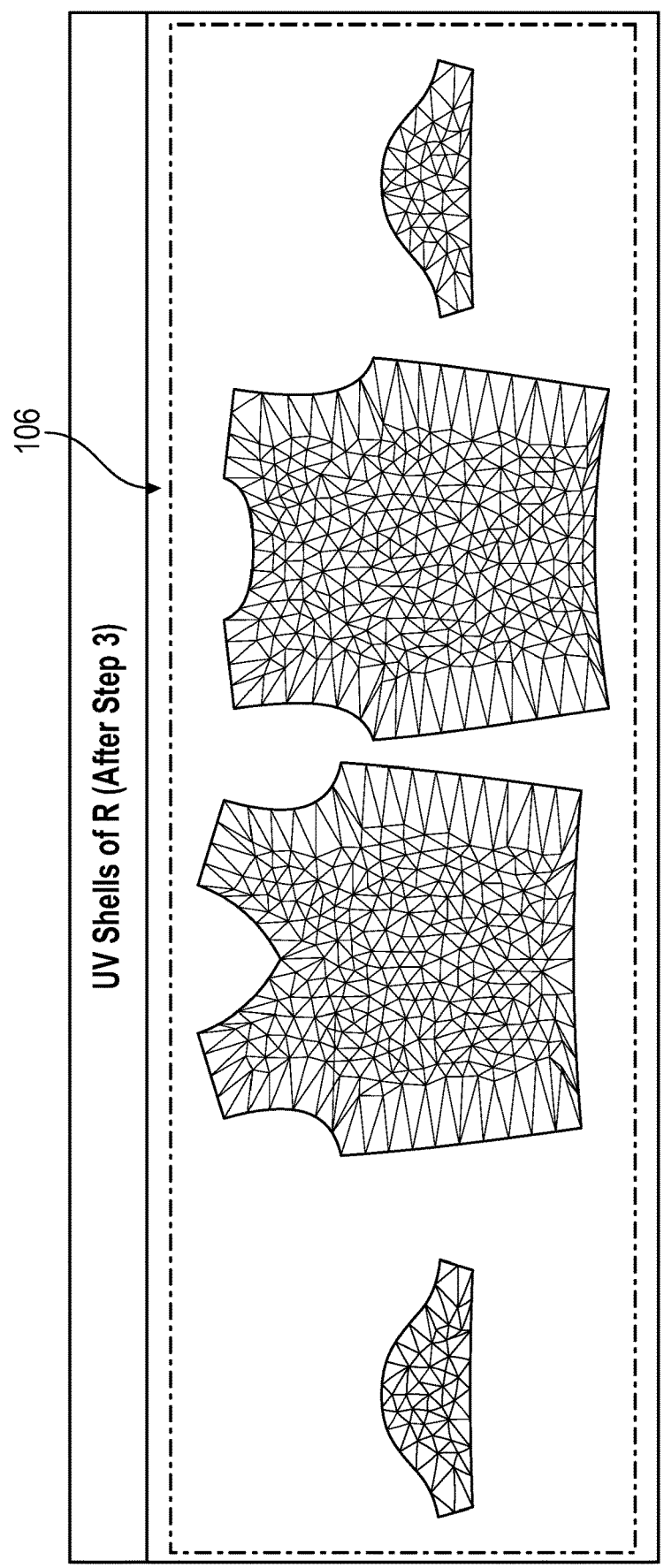
FIG. 3 is a screenshot of UV shells of an intermediate mesh.

That is, the resulting mesh R combines the topology of T with UV and geometry of G. It will be understood that T and G have the same UV shells in terms of the number of boundaries and boundary topological (connectivity) information. The 3D system can create R by initializing it to T. This process can include establishing consistency in a 1-D parametrization of boundaries of UV shells of the mesh R and G, by parametrization of boundaries from 0 to 1 and forcing consistent direction. The 3D system can, based on consistency of 1-D boundary parametrization, project the mesh R's UV boundary vertices onto G's UV boundaries to ensure the same UV boundary contours. UV shells of the mesh R are illustrated in FIG. 3 as representations 106.

Figure 4:
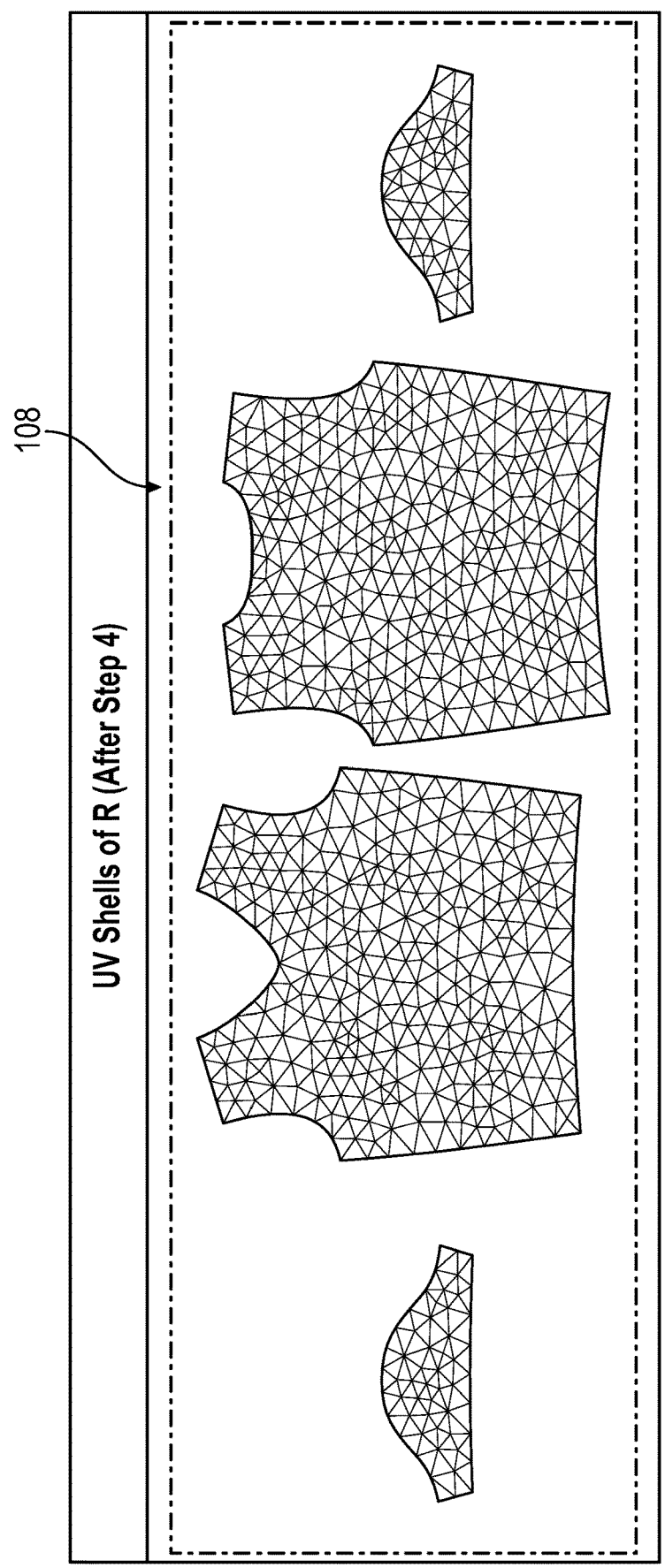
FIG. 4 is a screenshot illustrating the use of consistency 2-D parametrization of UV shells by rearranging interior UV vertices.

As illustrated in FIG. 4, the 3D system can establish consistency 2-D parametrization of UV shells, by rearranging interior UV vertices. Rearranged interior UV vertices 108 are also illustrated.

Figure 5:
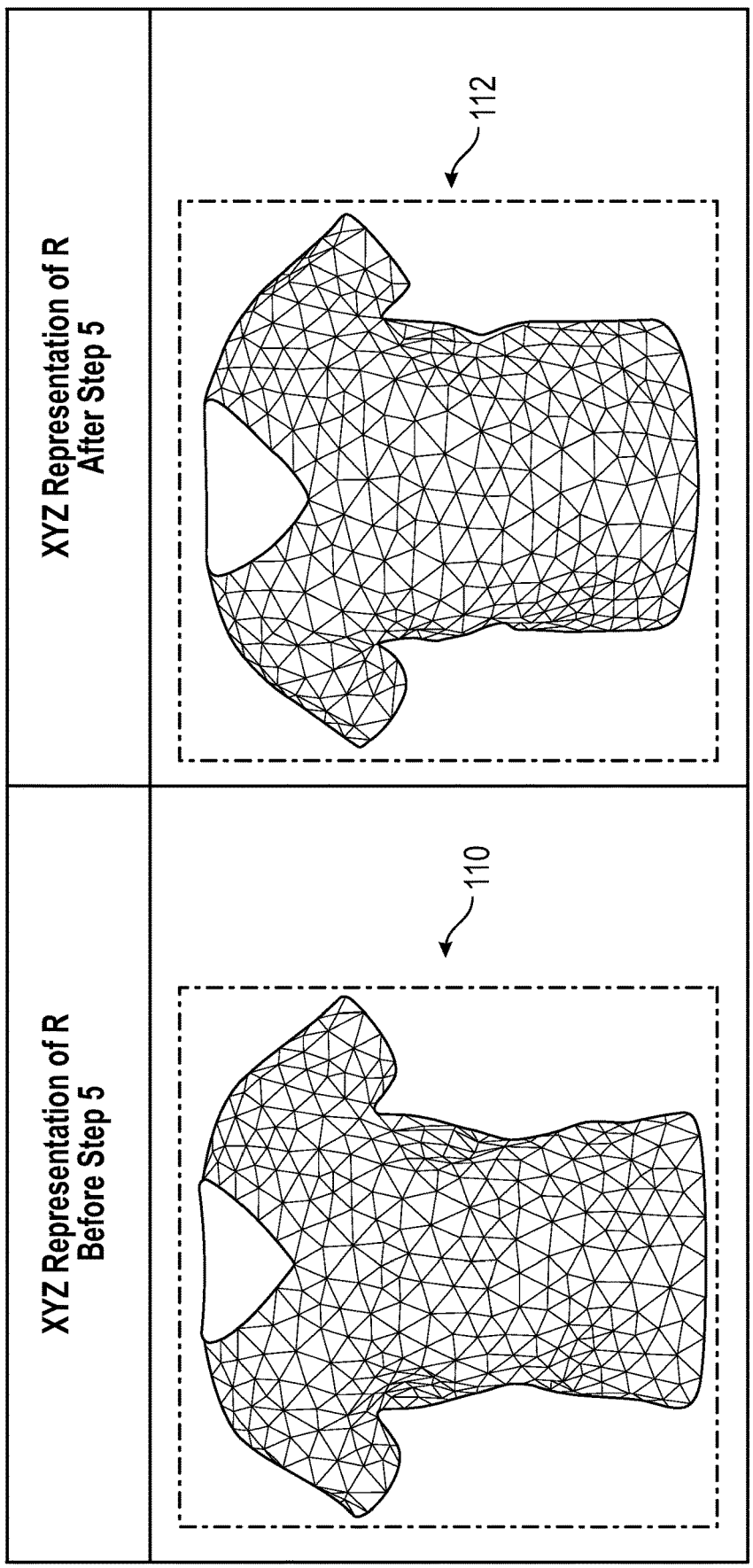
FIG. 5 is a screenshot illustrating computed positions of a resulting mesh R's vertices by mapping them from UV shell space to the 3D space of a garment.

As best illustrated in FIG. 5, the 3D system can, based on consistency 2-D shell parametrization, compute positions of R's vertices by mapping them from UV shell space to 3D space of a garment. An XYZ representation 110 of the mesh R prior to rearranging interior UV vertices, as well as an XYZ representation 112 of the mesh R, after rearranging interior UV vertices is also illustrated.

With the disclosed techniques, a realistic customized computer animation of a user wearing a particular one or more cloth garments can be generated in substantially real-time for a user of any shape and size. To be sure, FIGS. 6-9 collectively correspond to the illustrations and descriptions of FIGS. 1-5.

Figure 6:
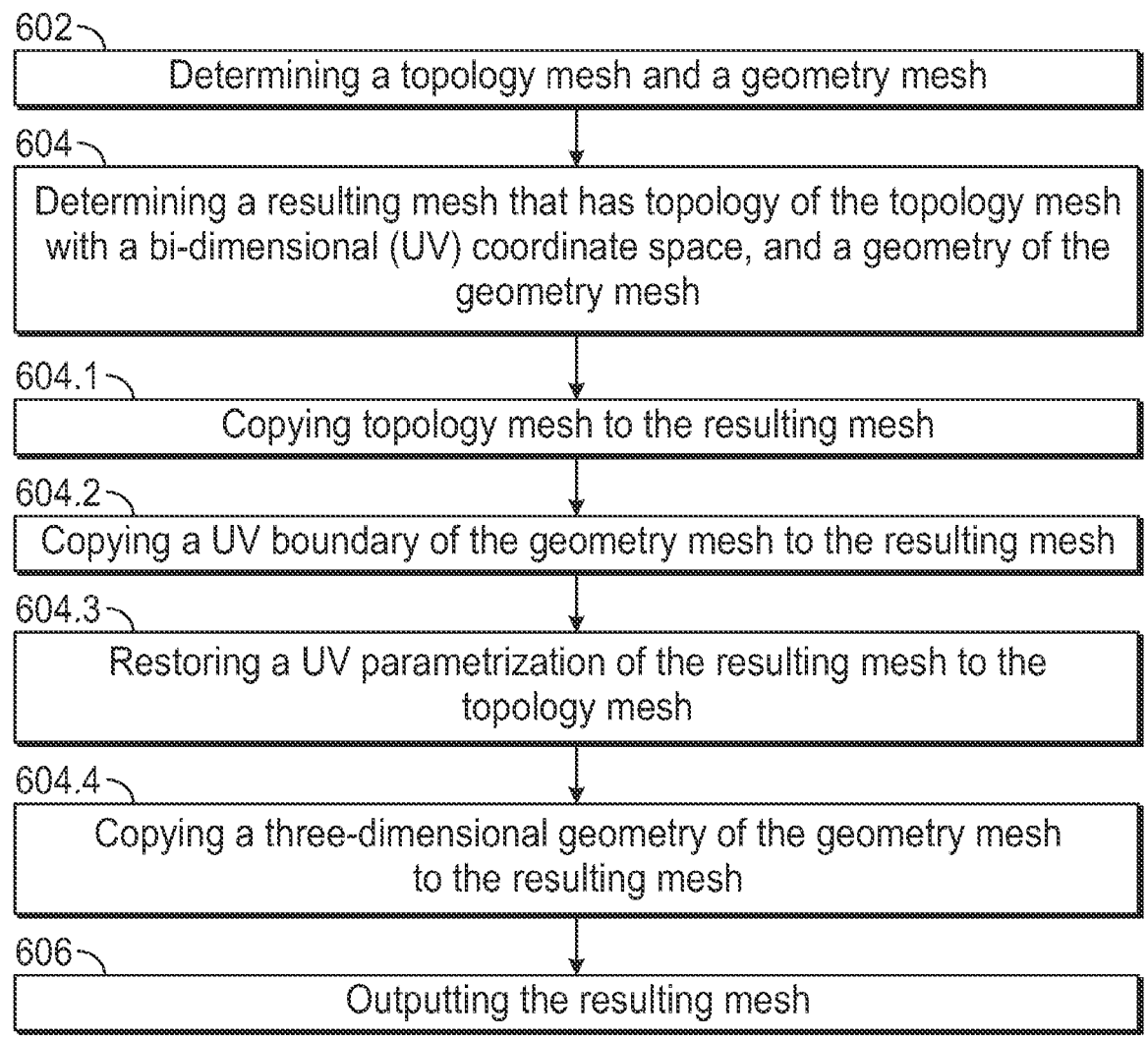
FIG. 6 is a flowchart of an example method of the present invention.

FIG. 6 is a flowchart of an example method of the present invention. The method can include a step 602 of determining a topology mesh and a geometry mesh, as well as a step 604 of determining a resulting mesh that combines a topology of the topology mesh with a bi-dimensional (UV) coordinate space, and a geometry of the geometry mesh. In some instances, step 604 includes sub-step 604.1 of copying the topology mesh to the resulting mesh. Next, the method includes a step 604.2 of copying a UV boundary of the geometry mesh to the resulting mesh, along with a step 604.3 of restoring a UV parameterization of the resulting mesh to the topology mesh. In some embodiments, the method includes a step 604.4 of copying a three-dimensional geometry of the geometry mesh to the resulting mesh. The resulting mesh comprises (1) a topology of the topology mesh of both 3D and UV representations; (2) UV parametrization of the topology mesh; (3) a 3D geometry of the geometry mesh; and (4) UV boundaries of UV shells of the geometry mesh.

The method can also include a step 606 of outputting the resulting mesh. The resulting mesh is utilized to generate a representation of a garment that is applied to an avatar. In some instances, the method can include resizing the avatar and the garment by recreating the resulting mesh by altering at least one of the UV boundary, the UV parameterization, or the three-dimensional geometry.

Figure 7:
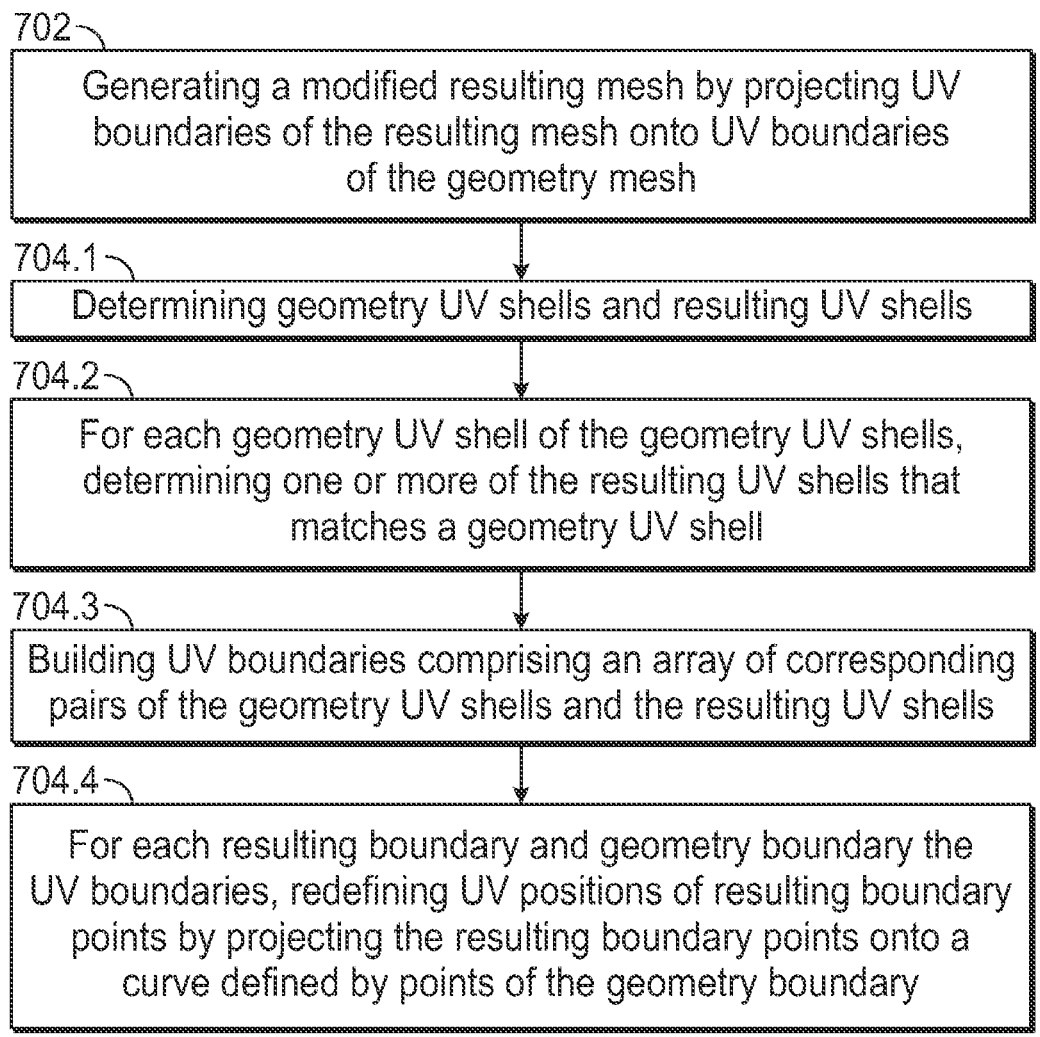
FIG. 7 is a flowchart of another example method of the present invention.

FIG. 7 is a flowchart of a method for copying a UV boundary. The method can include a step 702 of generating a modified resulting mesh by mapping UV boundaries of the resulting mesh onto UV boundaries of the geometry mesh.

In some embodiments, the generation of a modified resulting mesh can include a step 704.1 of determining geometry UV shells and resulting UV shells.

In some instances, for each geometry UV shell of the geometry UV shells, the method can include a step 704.2 of determining one or more of the resulting UV shells that matches a geometry UV shell. The method can also include a step 704.3 of building UV boundaries comprising an array of corresponding pairs of the geometry UV shells and the resulting UV shells. For each resulting boundary and geometry boundary the UV boundaries, the method can include a step 704.4 of redefining UV positions of resulting boundary points by mapping the resulting boundary points onto a curve defined by points of the geometry boundary.

Figure 8:
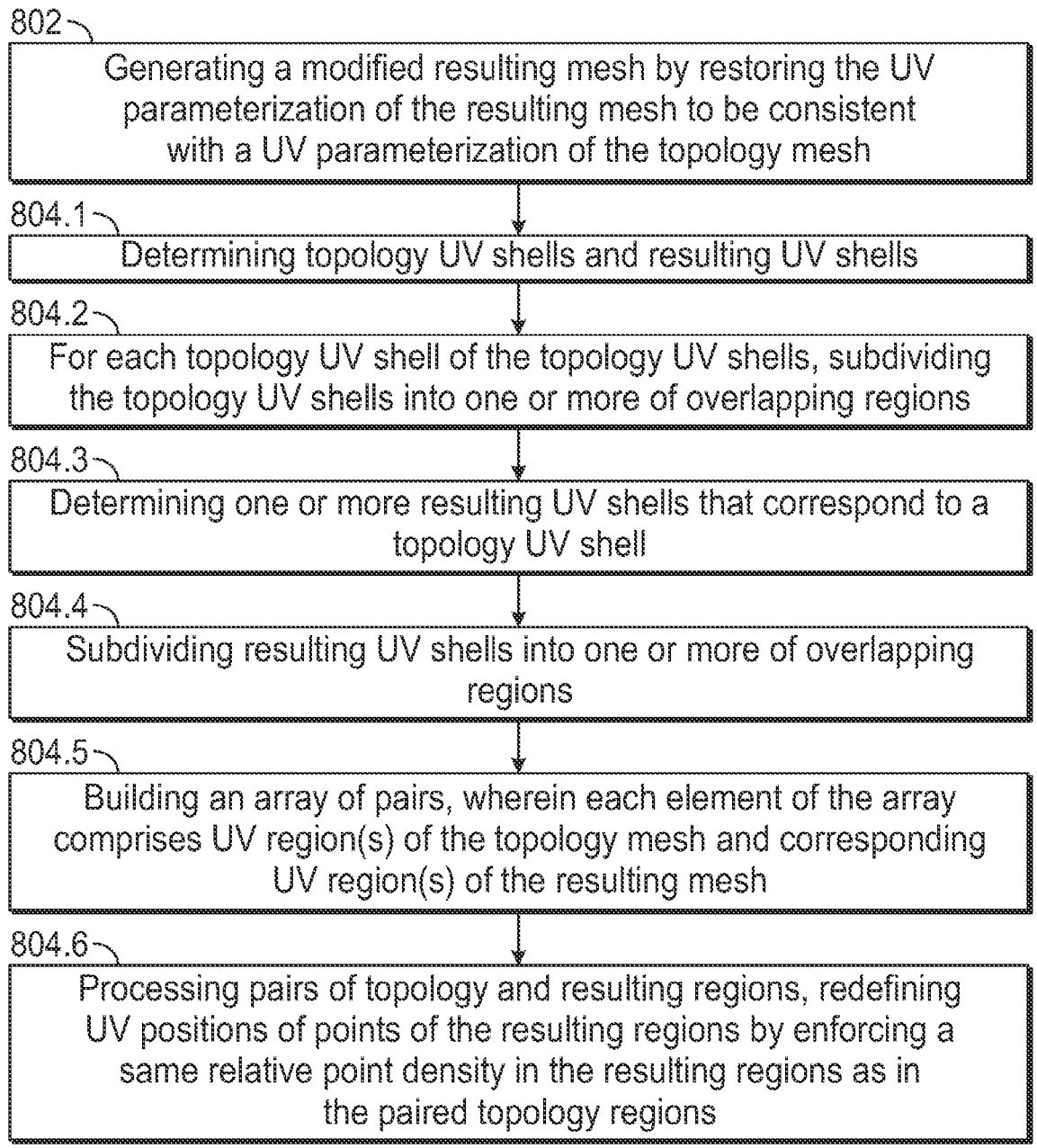
FIG. 8 is a flowchart of yet another example method of the present invention.

FIG. 8 is a flowchart of a method for restoring a UV parameterization. Conceptually, this process restores or preserves density information that may have been modified during the process of copying UV boundaries. The method can include a step 802 of generating a modified resulting mesh by restoring the UV parameterization of the resulting mesh to be consistent with a UV parameterization of the topology mesh. The method can include a step 804.1 of determining topology UV shells and resulting UV shells. For each topology UV shell of the topology UV shells, the method can include a step 804.2 of subdividing the topology UV shells into one or more of overlapping regions. In some embodiments, the method includes a step 804.3 of determining one or more resulting UV shells that correspond to a topology UV shell. The method can also include a step 804.4 of subdividing resulting UV shells into one or more of overlapping regions, as well as a step 804.5 of building an array of pairs, wherein each element of the array comprises UV region(s) of the topology mesh and corresponding UV region(s) of the resulting mesh In some embodiments, for each pair created from the overlapping topology regions and resulting regions in the array, the method can include a step 804.6 of processing pairs of topology and resulting regions, redefining UV positions of points of the resulting regions by enforcing a same relative point density in the resulting regions as in the paired topology regions.

Figure 9:
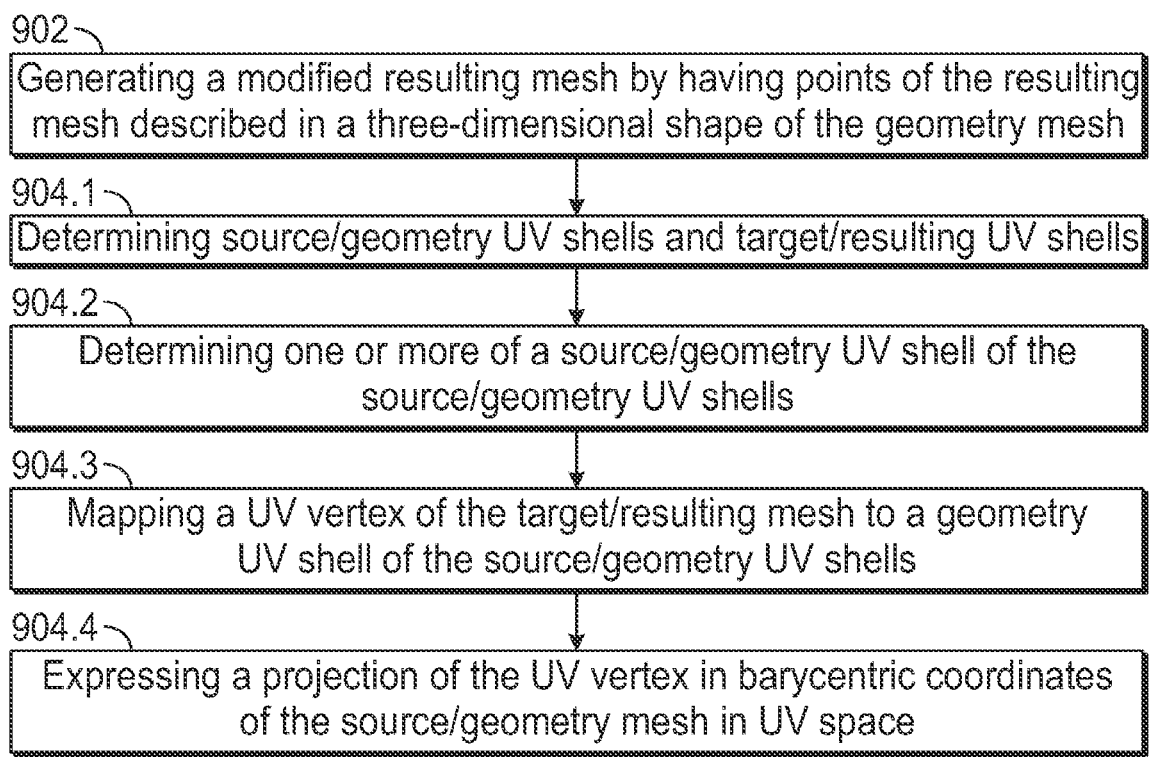
FIG. 9 is a flowchart of an additional example method of the present invention.

FIG. 9 is a flowchart of a method for copying a three-dimensional geometry. The method can include a step 902 of generating a modified resulting mesh by having points of the resulting mesh described in a three-dimensional shape of the geometry mesh, wherein geometry mesh and the resulting mesh comprise similar or identical UV parameterization based on the UV boundary restoration process described above.

Generating a modified target/resulting mesh can include various sub-steps. Thus, the method can include a step 904.1 of determining source geometry UV shells and target/resulting UV shells. For each resulting UV shell in the target/resulting UV shells, the method can include a step 904.2 of determining one or more of a source/geometry UV shell of the source/geometry UV shells. For each resulting vertex of the resulting/target UV shells, the method can include a step 904.3 of mapping a UV vertex of the target/resulting mesh to a geometry UV shell of the source/geometry UV shells. The method can also include as step 904.4 of expressing a projection of the UV vertex in barycentric coordinates of the source/geometry mesh in UV space. It will be understood that a three-dimensional shape of the target/resulting mesh is defined by XYZ components of the target/resulting vertices. It will be further understood that XYZ components of the target/resulting vertices may be result of evaluation the barycentric coordinates of the source/geometry mesh in three-dimensional space.

Figure 10:
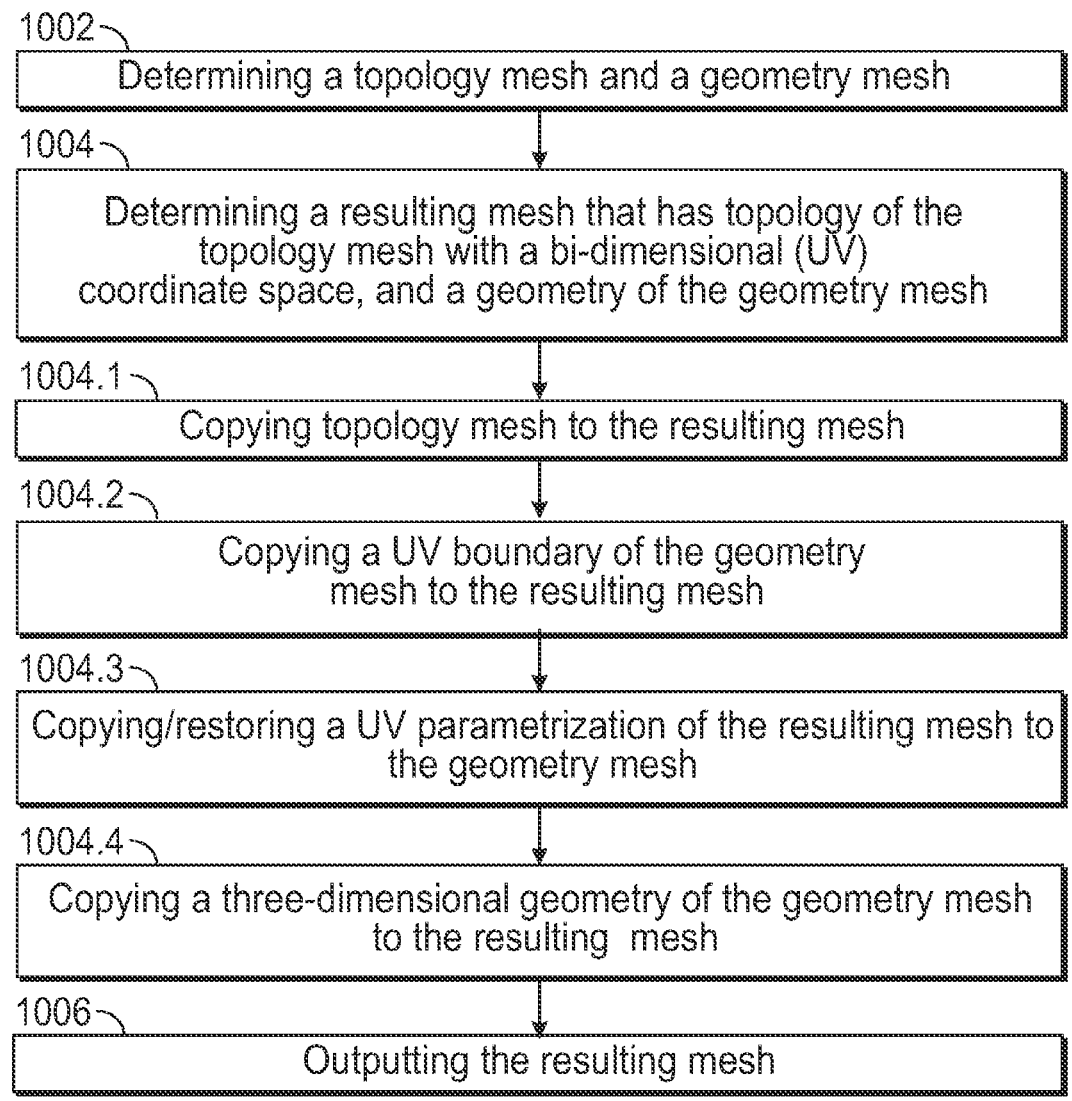
FIG. 10 is a flowchart of a variation of the method of FIG. 6.

FIG. 10 is a flowchart of an example method of the present invention. This method is a variation of the method disclosed above with respect to FIG. 6. The method can include a step 1002 of determining a topology mesh and a geometry mesh, as well as a step 1004 of determining a resulting mesh that combines a topology of the topology mesh with a bi-dimensional (UV) coordinate space, and a geometry of the geometry mesh. In some instances, step 1004 includes sub-step 1004.1 of copying the topology mesh to the resulting mesh. Next, the method includes a step 1004.2 of copying a UV boundary of the geometry mesh to the resulting mesh, along with a step 1004.3 of copying/ restoring a UV parametrization of the resulting mesh to the geometry mesh. In some embodiments, the method includes a step 1004.4 of copying a three-dimensional geometry of the geometry mesh to the resulting mesh.

The method can also include a step 1006 of outputting the resulting mesh. The resulting mesh is utilized to generate a representation of a garment that is applied to an avatar. In some instances, the method can include resizing the avatar and the garment by recreating the resulting mesh by altering at least one of the UV boundary, the UV parameterization, or the three-dimensional geometry. The steps of copying UV boundaries, UV parameterization, and 3D gemetry can be accomplished using methods of FIGS. 7-9. In contrast to the method of FIG. 6, this method involves copying/restoring UV parameterization (e.g., density) of the geometry, rather than the topology.

Figure 11:
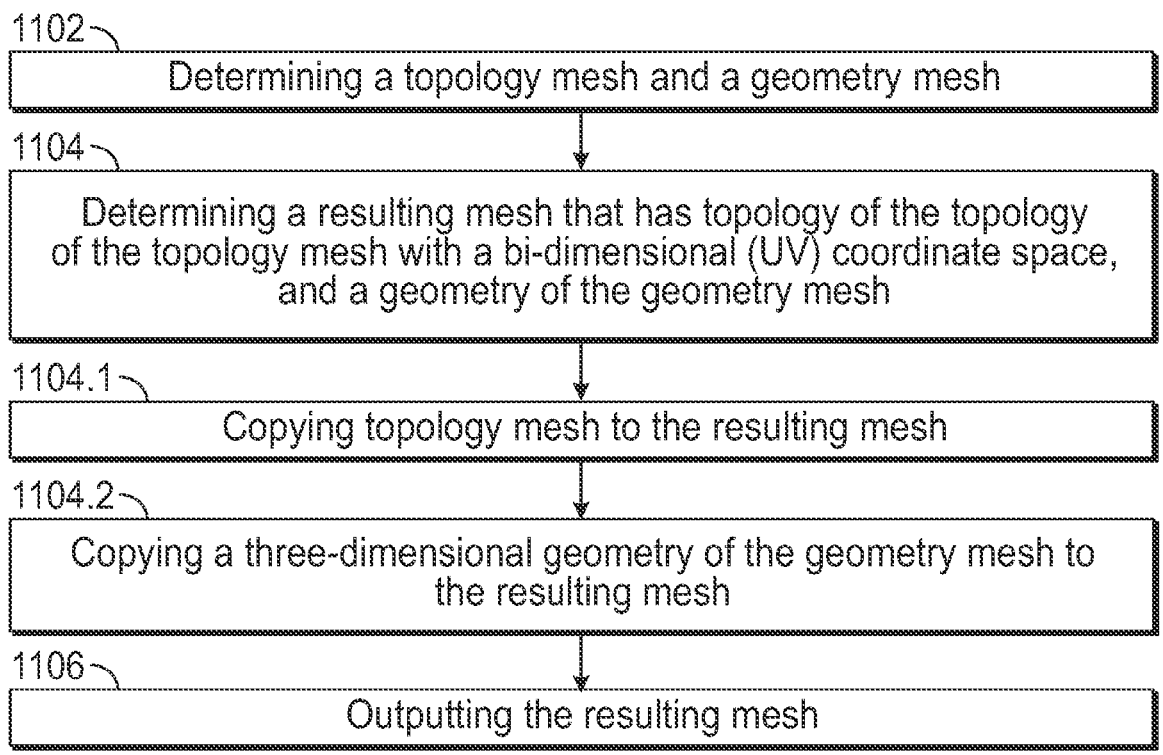
FIG. 11 is a flowchart of another variation of the method of FIG. 6.

FIG. 11 is a flowchart of an example method of the present invention. This method is a variation of the method disclosed above with respect to FIG. 6. The method can include a step 1102 of determining a topology mesh and a geometry mesh, as well as a step 1104 of determining a resulting mesh that combines a topology of the topology mesh with a bi-dimensional (UV) coordinate space, and a geometry of the geometry mesh. In some instances, step 1104 includes sub-step 1104.1 of copying the topology mesh to the resulting mesh. In some embodiments, the method includes a step 1104.2 of copying a three-dimensional geometry of the geometry mesh to the resulting mesh.

The method can also include a step 1106 of outputting the resulting mesh. The resulting mesh is utilized to generate a representation of a garment that is applied to an avatar. In some instances, the method can include resizing the avatar and the garment by recreating the resulting mesh by altering at least one of the UV boundary, the UV parameterization, or the three-dimensional geometry. It will be understood that the step of copying geometry can be performed using the geometry copying methods as set forth above, with the exception that in this method related to FIG. 10, the UV parameterization of the geometry is copied/restored rather than the topology. This method excludes steps related to copying UV boundaries and UV parameterization restoration.

FIG. 12 illustrates example pseudocode for implementing the methods disclosed herein for measurement space deformation and three-dimensional interpolation. The pseudocode correlates, in part, or in whole, to the methods of FIGS. 7-11, as well as other descriptions provided herein. As used herein, the term "source" shall be understood to include either the geometry mesh or the topology mesh based on context. The "target" will be understood to be the resulting mesh.

In general, there are three variations of general methods that can be used in accordance with the present disclosure. The first variation (VARIATION 1) involves creating a resulting mesh having a topology of the topology mesh, geometry of the geometry mesh, as well as UV boundaries of the geometry mesh and UV parametrization of topology mesh. An example of VARIATION 1 is illustrated and described with respect to FIG. 6, and set forth more fully in the sections above.

VARIATION 2 involves creating a resulting mesh having a topology of topology mesh and a geometry of the geometry mesh, as well as UV boundaries and UV parameterization of the geometry mesh.

A third variation (VARIATION 3) is similar to the methods of VARIATIONS 1 and 2, and involves creating a resulting mesh having a topology of topology mesh and a geometry of the geometry mesh, as well as UV boundaries and UV parameterization of the topology mesh.

Exemplary Computing System

FIG. 13 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions.

The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present invention and are intended to represent a broad category of such computer components that are known in the art. Thus, the computer system 1 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer device 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the present invention. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present invention may be written in any combination of one or more programming languages, including an object oriented programming language such as Java, Smalltalk, C++, or the like, or conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN); or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present invention.

The embodiments can be combined, other embodiments can be utilized, or structural, logical, and electrical changes can be made without departing from the scope of what is claimed. The following detailed description is, therefore, not to be taken in a limiting sense; rather, the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present invention and its practical application, and to enable others of ordinary skill in the art to understand the invention for various embodiments with various modifications as are suited to the particular use contemplated.

While various embodiments have been described above, they have been presented by way of example only, and not limitation. The descriptions are not intended to limit the scope of the invention to the forms set forth herein. Thus, the breadth and scope of a preferred embodiment should not be limited by any of the above-described exemplary embodiments. The above description is illustrative and not restrictive.

Appendices A and B are part of this specification.

What is claimed is:

1. A computer implemented measurement space deformation method for generating an electronic animation of a representation of a user, said method comprising the steps of:
    defining a multi-dimensional measurement space, each dimension of the multi-dimensional measurement space corresponding to at least one body measurement category of a human body;
    populating the multi-dimensional measurement space with a set of pre-computed example avatars, each example avatar in the set having dimensions corresponding to multiple body measurement categories of the human body, the multiple body measurement categories including at least two of hip length, hip width, bust length, bust width, arm length, leg length, or body height;
    searching the measurement space for a subset of example avatars having avatar dimension values near user dimension values of the user for the multiple body measurement categories, the user dimension values being obtained from physical measurements of a body of the user, each example avatar in the subset having a subset of the avatar dimension values within a predetermined threshold of the user dimension values of the user for at least one body measurement category of the human body; and
    interpolating between the subset of the avatar dimension values of the example avatars of the subset, body measurement category by body measurement category, based upon the user dimension values of the user for the multiple measurement categories of the human body, to generate a frame of the electronic animation that represents a physical appearance of the user, the electronic animation usable to simulate how one or more garments appear on the body of the user.

2. The method of claim 1, wherein the interpolating comprises constructing a dependency graph of body measurement category dependencies to facilitate a determination of an order in which the avatar dimension values are to be interpolated based on the multiple body measurement categories.

3. The method of claim 1, wherein the populating comprises placing the set of pre-computed example avatars in the multi-dimensional measurement space based upon the avatar dimension values of the example avatars, each body measurement within each body measurement category being assigned a weight that indicates how much the avatar dimension values influence mesh vertices on the frame of the electronic animation.

4. The method of claim 1, wherein the user is garmented.

5. The method of claim 4, wherein the method further comprises presenting different sizes of a garment on the electronic animation.

6. The method of claim 1, wherein one or more first body measurements of at least one body measurement category of the multi-dimensional measurement space depend on one or more second body measurements, the one or more first body measurements being interpolated after interpolation of the one or more second body measurements.

7. The method of claim 1, wherein the interpolating comprises interpolating between the avatar dimension values of a first pair of example avatars for a first body measurement category and interpolating between the avatar dimension values of a second pair of example avatars for a second body measurement category, the first body measurement category including one or more length measurements and the second body measurement category including one or more width measurements.

8. An apparatus configured to generate an electronic animation of a representation of a user, said apparatus comprising:
    a multi-dimensional measurement space based upon body measurement categories of a human body, each dimension of the multi-dimensional measurement space corresponding to at least one body measurement category of a human body;
    coupled to the measurement space, a computational module for computing a set of example avatars, each example avatar in the set having dimensions corresponding to multiple body measurement categories of the human body, the multiple body measurement categories including at least two of hip length, hip width, bust length, bust width, arm length, leg length, or body height; and
    coupled to the computational module, an interpolation module configured to interpolate between a subset of avatar dimension values of example avatars, body measurement category by body measurement category, based upon user dimension values of the user for multiple measurement categories, to generate a frame of an electronic animation of the user representation that represents a physical appearance of the user, the electronic animation usable to simulate how one or more garments appear on the body of the user, the user dimension values being obtained from physical measurements of a body of the user, each example avatar in the subset having a subset of the avatar dimension values within a predetermined threshold of the user dimension values of the user for at least one body measurement category of the human body.

9. The apparatus of claim 8, wherein the interpolation module is configured to interpolate by constructing a dependency graph of body measurement category dependencies to facilitate a determination of an order in which the avatar dimension values are to be interpolated based on the multiple body measurement categories.

10. The apparatus of claim 8, wherein the computational module is further configured to populate the multi-dimensional space by placing a set of pre-computed example avatars in the multi-dimensional measurement space based upon the avatar dimension values of the example avatars, each body measurement within each body measurement category being assigned a weight that indicates how much the avatar dimension values influence mesh vertices on the frame of the electronic animation.

11. The apparatus of claim 8, wherein the user is garmented.

12. The apparatus of claim 11, wherein the computational module is further configured to present different sizes of a garment on the electronic animation.

13. The apparatus of claim 8, wherein one or more first body measurements of at least one body measurement category of the multi-dimensional measurement space depend on one or more second body measurements, the one or more first body measurements being interpolated after interpolation of the one or more second body measurements.

14. The apparatus of claim 8, wherein the interpolation module is further configured to interpolate between the avatar dimension values of a first pair of example avatars for a first body measurement category and interpolate between the avatar dimension values of a second pair of example avatars for a second body measurement category, the first body measurement category including one or more length measurements and the second body measurement category including one or more width measurements.

15. One or more non-transitory computer-readable storage media storing instructions that, responsive to execution by a processing device, cause the processing device to:
define a multi-dimensional measurement space, with each dimension of the multi-dimensional measurement space corresponding to at least one body measurement category of a human body;
populate the multi-dimensional measurement space with a set of pre-computed example avatars, each example avatar in the set having dimensions corresponding to multiple body measurement categories of the human body, the multiple body measurement categories including at least two of hip length, hip width, bust length, bust width, arm length, leg length, or body height;
search the measurement space for a subset of example avatars having avatar dimension values near user dimension values of the user for the multiple body measurement categories, the user dimension values being obtained from physical measurements of a body of the user, each example avatar in the subset having a subset of the avatar dimension values within a predetermined threshold of the user dimension values of the user for at least one body measurement category of the human body; and
interpolate between the subset of the avatar dimension values of the example avatars of the subset, body measurement category by body measurement category, based upon the user dimension values of the user for the multiple measurement categories of the human body, to generate a frame of the electronic animation that represents a physical appearance of the user, the electronic animation usable to simulate how one or more garments appear on the body of the user.

16. The one or more non-transitory computer-readable storage media of claim 15, wherein the user is garmented.

17. The one or more non-transitory computer-readable storage media of claim 16, wherein the one or more computer-readable storage media store additional instructions that, responsive to execution by the processing device, cause the processing device to present different sizes of a garment on the electronic animation.

18. The one or more non-transitory computer-readable storage media of claim 15, wherein the one or more computer-readable storage media store additional instructions that, responsive to execution by the processing device, cause the processing device to interpolate by constructing a dependency graph of body measurement category dependencies to facilitate a determination of an order in which the avatar dimension values are to be interpolated based on the multiple body measurement categories.

19. The one or more non-transitory computer-readable storage media of claim 15, wherein the one or more computer-readable storage media store additional instructions that, responsive to execution by the processing device, cause the processing device to populate the multi-dimensional space by placing a set of pre-computed example avatars in the multi-dimensional measurement space based upon the avatar dimension values of the example avatars, each body measurement within each body measurement category being assigned a weight that indicates how much the avatar dimension values influence mesh vertices on the frame of the electronic animation.

20. The one or more non-transitory computer-readable storage media of claim 15, wherein the one or more computer-readable storage media store additional instructions that, responsive to execution by the processing device, cause the processing device to interpolate between the avatar dimension values of a first pair of example avatars for a first body measurement category and interpolate between the avatar dimension values of a second pair of example avatars for a second body measurement category, the first body measurement category including one or more length measurements and the second body measurement category including one or more width measurements.

* * * * *